April 6, 1954  
C. M. EASON  
2,674,356  
AIR OPERATED CLUTCH-BRAKE MECHANISM  
Filed Sept. 6, 1950  
5 Sheets-Sheet 3
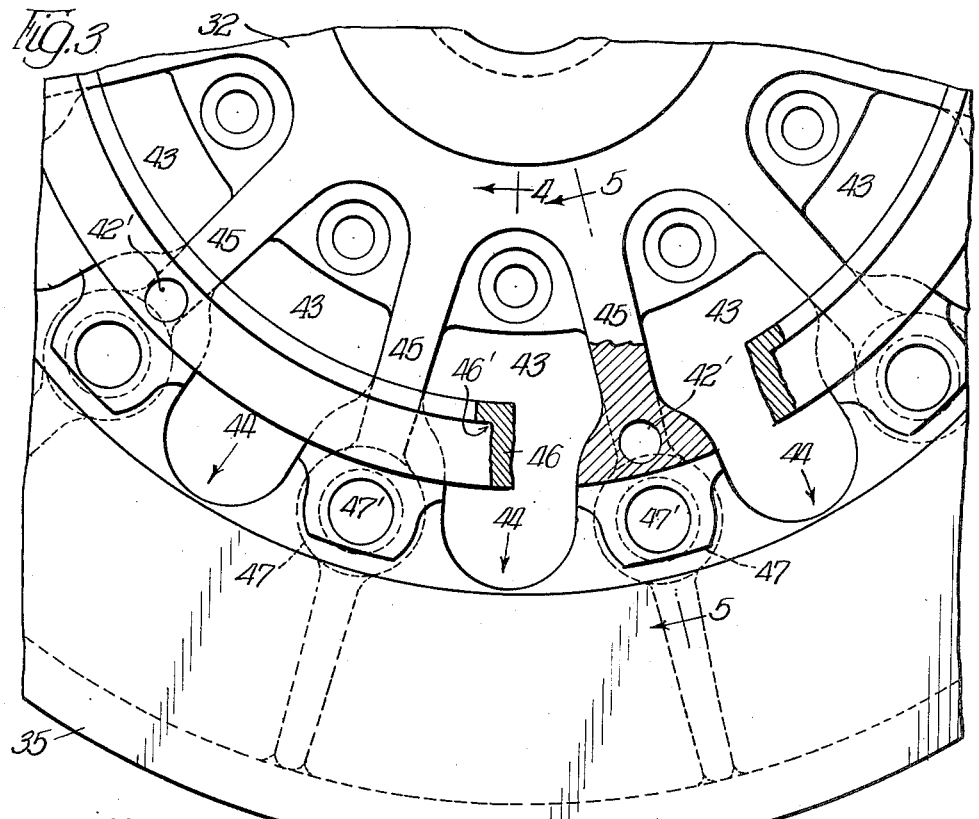
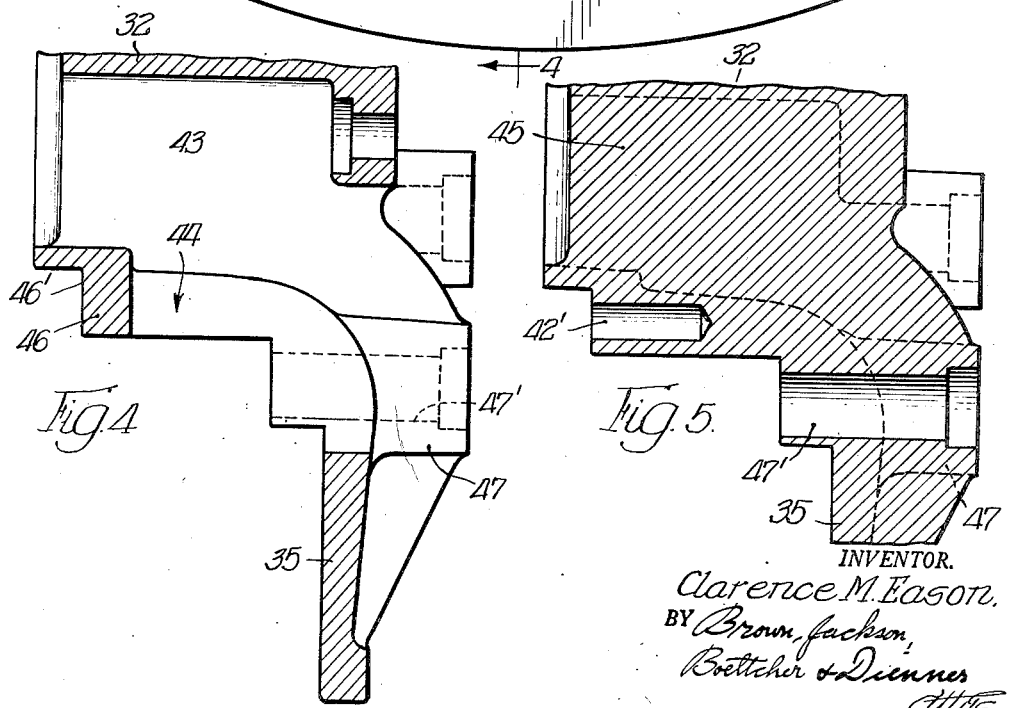
INVENTOR.  
Clarence M. Eason.

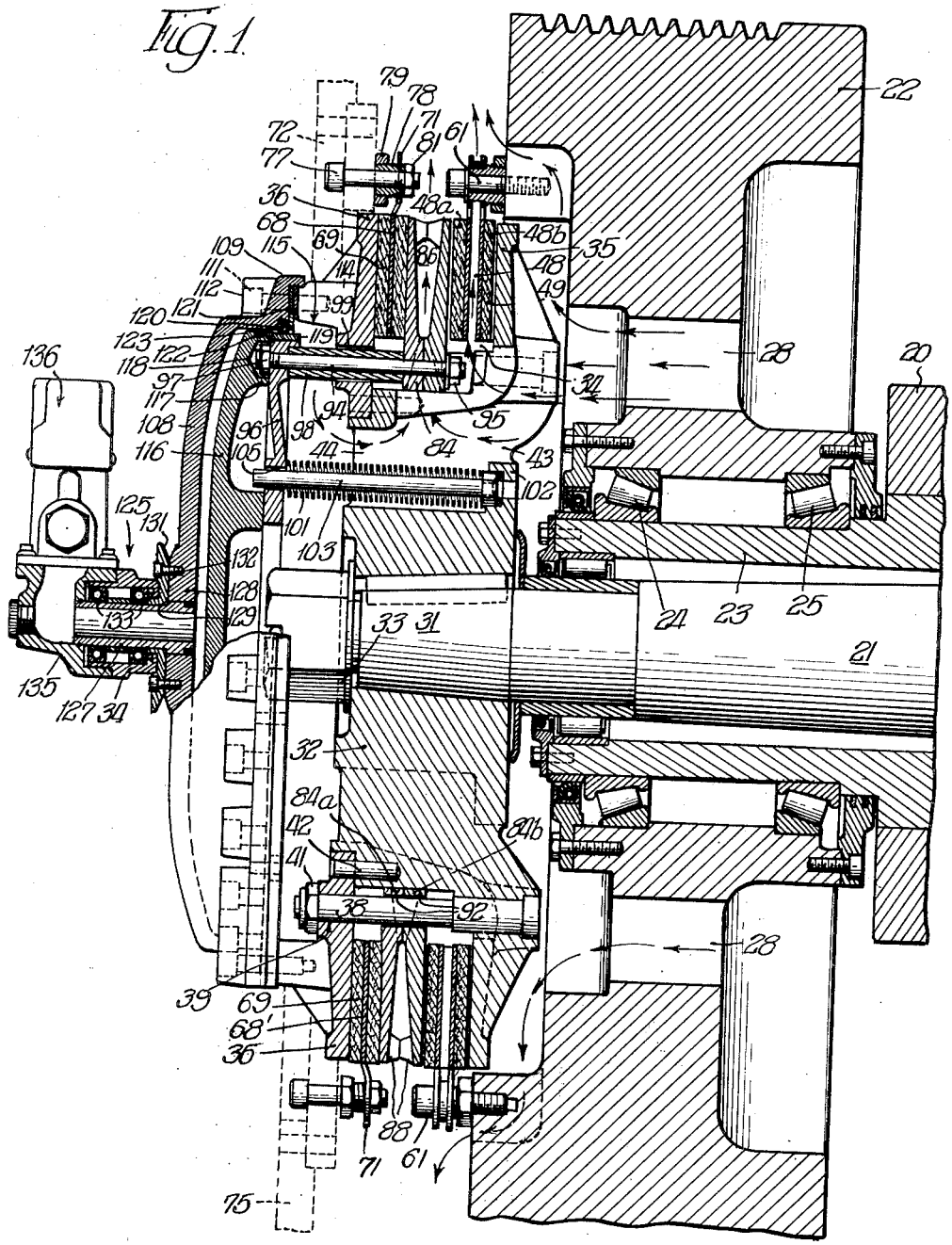

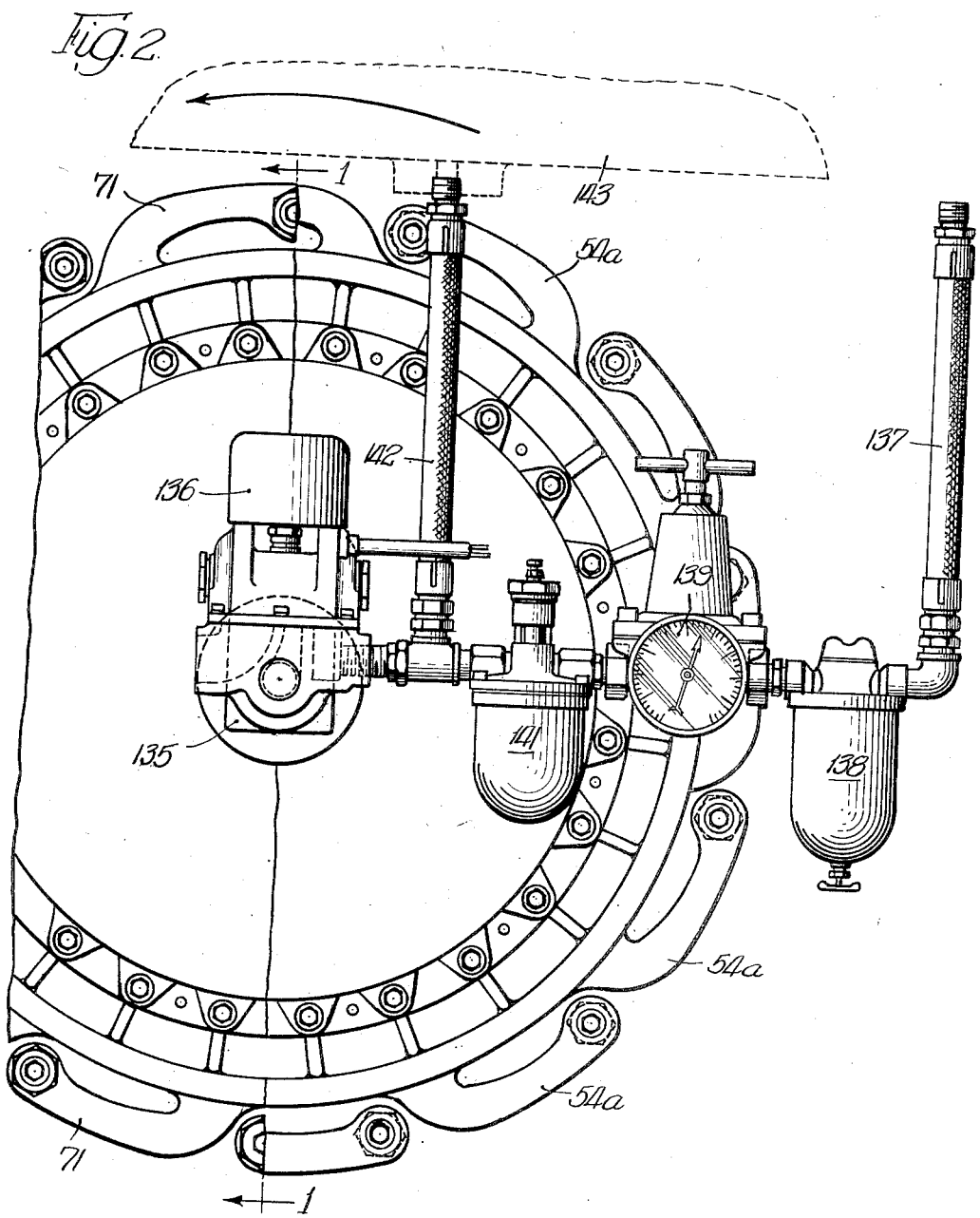

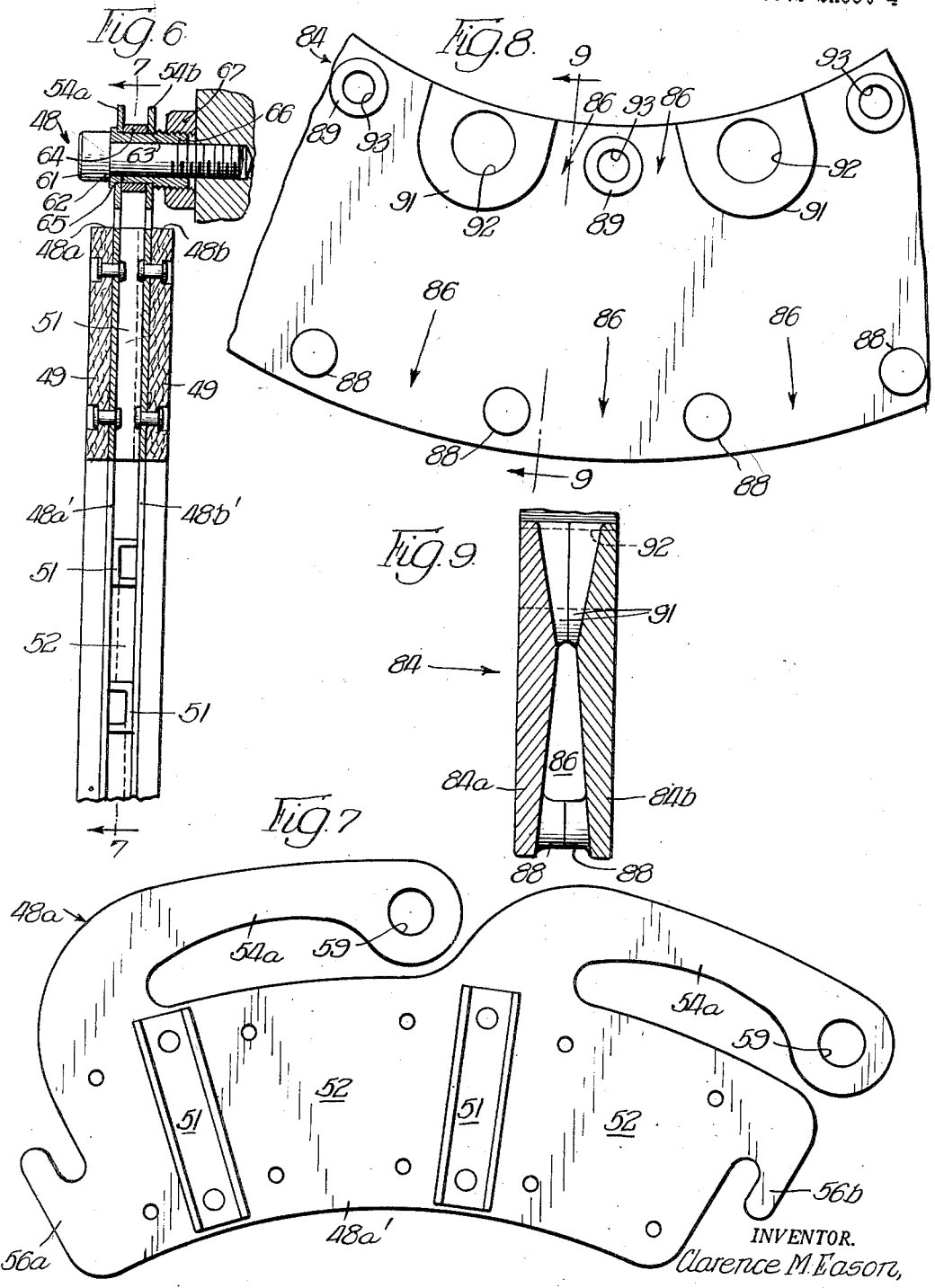

April 6, 1954

C. M. EASON 2,674,356

AIR OPERATED CLUTCH-BRAKE MECHANISM

Filed Sept. 6, 1950

INVENTOR.
Clarence M. Eason
BY Brown, Jackson,
Boettcher & Dienner
Attys.

Patented Apr. 6, 1954

2,674,356

UNITED STATES PATENT OFFICE 2,674,356

AIR OPERATED CLUTCH-BRAKE MECHANISM

Clarence M. Eason, Waukesha, Wis., assignor to Industrial Clutch Corporation, Waukesha, Wis., a corporation of Wisconsin Application September 6, 1950, Serial No. 183,404

13 Claims. (Cl. 192—18)

The present invention relates to an improved clutch-brake mechanism of the type adapted to be operated by compressed air to effect the quick starting and stopping of a rotary driven member.

These compressed air operated clutch-brake mechanisms have advantageous use in heavy duty machine tools and like industrial situations, such as for the operation of power shears, punch presses, etc. The success or failure of the clutch-brake mechanism in many of these situations is dependent upon the ability to cool the clutch-brake mechanism, or to prevent excessive temperature rise in the frictional surfaces and adjacent parts. The amount of heat generated in these clutch-brake mechanisms in the quick starting and stopping of large driven shafts, cranks, rams and the like, can become very large with frequent operation, with the result that some of the prior devices known to me have literally burned themselves up.

One of the objects of the present invention is to obtain a more efficient cooling function in these clutch-brake mechanisms. For example, in the preferred embodiments of my invention the driving frictional clutch elements and the compressed-air shifted clutch-brake plates are of hollow ventilated construction for an effective internal circulation of air in immediate proximity to the frictional clutch and brake surfaces. This hollow driving frictional clutch element rotates at all times, irrespective of whether the clutch is engaged or the brake is engaged, and this continuously rotating driving frictional clutch element is utilized as an air impeller for continuously inducing a flow of air into contact with those frictional surfaces which are subject to high heating. The shiftable clutch-brake plate rotates during the entire time that the clutch is engaged, and the improved hollow construction of this plate likewise impels air therethrough at this time. Also, to the end of more effective cooling, the driven hub structure of the device has an improved arrangement of air circulating passageways communicating with the air impelling passageways of the driving clutch element and the shiftable clutch-brake plate.

Still another feature of the invention having to do with cooling is the location of the frictional clutch surfaces and the frictional brake surfaces outwardly of the machine frame and outwardly of the fly wheel, in a position where air has free access to such surfaces for rapid heat dissipation, and where a more effective circulatory flow of air can be maintained through the hollow driving clutch disk and the hollow shiftable clutch-brake plate. If the frictional clutch surfaces and/or the frictional brake surfaces are located in the confined space between the end of the machine frame and the fly wheel, the generated heat is more confined and there is less freedom of the air to reach the heated surfaces.

Other objects of the invention are to minimize vibration and bearing wear; facilitate connection of the compressed air to the actuating air cylinder; facilitate the transmission of motion from the actuating air cylinder to the shiftable clutch-brake plate; facilitate wear adjustments of the friction surfaces; and simplify the cost of construction and assembly of the entire mechanism; all by a unique construction and arrangement wherein the fly wheel is located directly adjacent to the frame of the machine, the friction clutch is located outwardly of this fly wheel, the friction brake is located outwardly of the clutch, and the air cylinder is located outwardly of the friction brake, all in a compact unit having a minimum overhang beyond the end of the main frame and its bearing. The fact that the air cylinder is outermost in the assembly also facilitates the ready replacement of the air cylinder packing ring in the event of wear. In one embodiment of my invention I have shown how I can dispense with the need of an outboard bearing, and in another embodiment of the invention I have shown how such an outboard bearing can be employed beyond the air cylinder, if desired.

Another object of the invention is to provide an air operated clutch-brake mechanism of the above general description wherein the clutch is characterized by an improved laterally flexible clutch disk, and wherein the brake is also characterized by an improved laterally flexible brake disk. In the case of both the clutch and the brake, the separation which occurs between frictional surfaces when the clutch or the brake is released is a separation which is brought about by the lateral flexibility of spring fingers which peripherally support the friction disk.

In one embodiment of the invention, I construct the clutch with a single driving clutch disk of the laterally flexible type, and when this embodiment of clutch is released the lateral flexibility of the spring finger mounting of the driving clutch disk automatically centers or restores this disk to a position where its friction surfaces are free, so that there is no frictional drag between clutch surfaces tending to develop heat when the clutch is released. In another embodiment of the invention of a larger load capacity, I employ a plurality of these laterally flexible driving clutch disks, and in conjunction therewith I also employ a plurality of axially shiftable driven clutch plates, the driving clutch disks and the driven clutch plates being squeezed together in the clutch engaging operation. In the clutch releasing operation, the axially shiftable driven clutch plates are also automatically centered or restored to positions where the friction surfaces are free, so that there is no frictional drag between clutch surfaces tending to develop heat. One of the additional features of the invention is the provision of an improved spring actuated floating mounting of one or more of these axially shiftable driven clutch plates, so that the latter will automatically resume its proper position of axial spacing with respect to the other parts of the clutch when the clutch is released.

Other objects, features and advantages of the invention will appear from the following detail description of two preferred embodiments thereof. In the accompanying drawings illustrating such embodiments:

Figure 1 is a fragmentary axial sectional view through one embodiment of the invention, corresponding to a section taken approximately on the plane of the line 1—1 of Figure 2;

Figure 2 is a fragmentary end elevational view of the embodiment as shown in Figure 1, one-half of the assembly being broken away to a different plane to show that the spring fingers of the clutch disk face in the opposite direction from the spring fingers of the brake disk;

Figure 3 is a fragmentary front elevational view of the hub structure casting before any of the clutch or brake parts have been assembled thereon;

Figure 10:
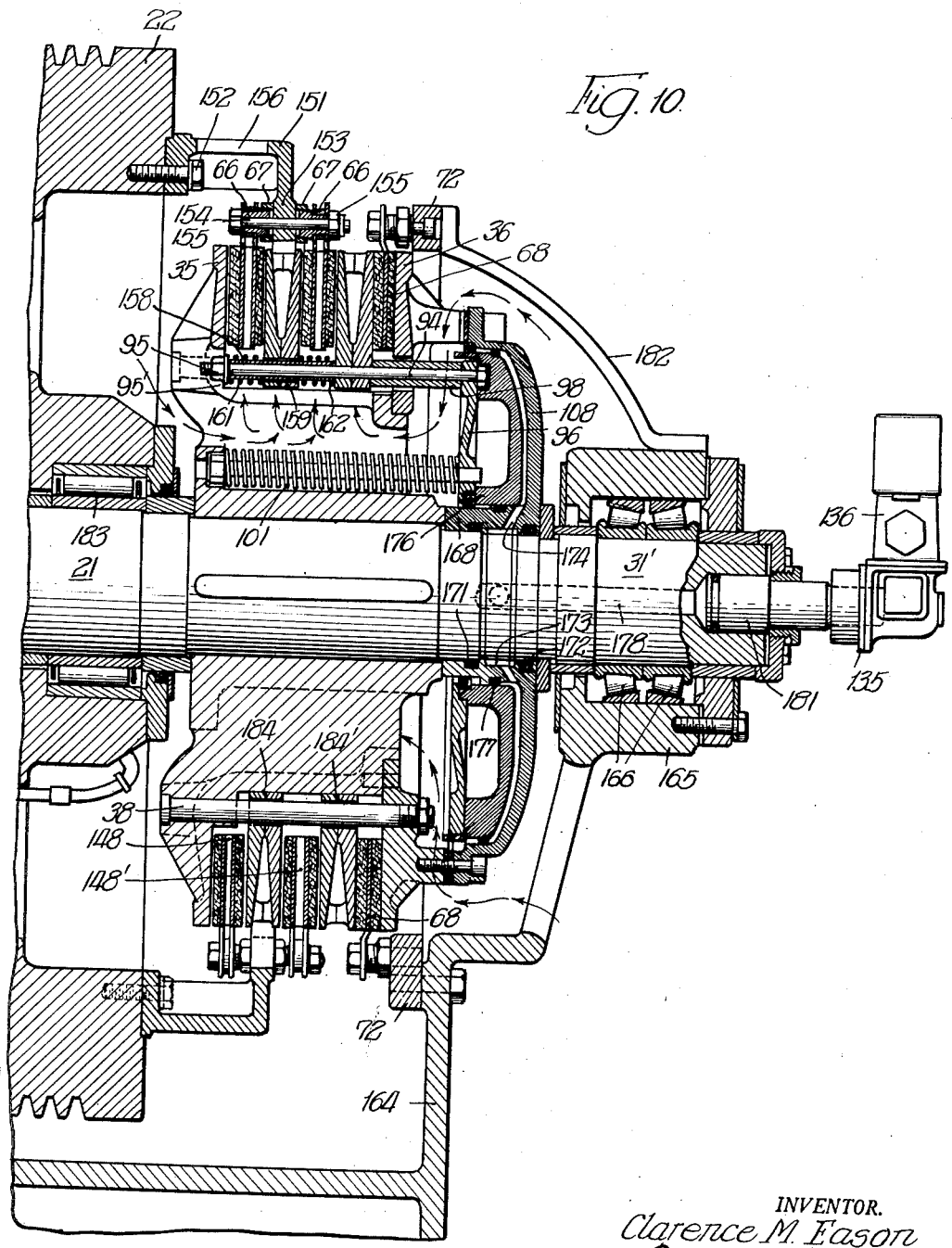

Figures 4 and 5 are transverse sections taken approximately on the planes of the lines 4—4 and 5—5 of Figure 3;

Figure 6 is a fragmentary sectional view of the driving clutch disk on a larger scale, showing the hollow construction that produces the air impelling action;

Figure 7 is a fragmentary inner side view of one of the driving clutch disk segments, taken approximately on the plane of the line 7—7 of Figure 6, showing two of the spring fingers and also showing the spacing channels which space the right and left halves of the clutch disk apart;

Figure 8 is a fragmentary inner side view of one of the halves of the shiftable clutch-brake plate, showing the spacing bosses which project inwardly from the inner face of each of these halves;

Figure 9 is a transverse sectional view of the assembled clutch-brake plate, corresponding to a section on the plane of the line 9—9 of Figure 8; and Figure 10 is a fragmentary axial sectional view through another embodiment of my invention.

Referring first to the embodiment illustrated in Figures 1 and 2, the frame of the power shear punch press or other machine to be driven by the clutch-brake mechanism is indicated fragmentarily at 20, and the driven shaft which is started and stopped by the clutch-brake mechanism is indicated at 21. The driving fly wheel or belt pulley for driving the shaft is indicated at 22. This fly wheel is journaled upon a stationary tubular quill 23, which projects outwardly from the side or end of the frame 20 concentrically of the shaft 21. Front and rear roller bearings 24 and 25 rotatably support the fly wheel 22 upon the quill 23. The fly wheel is usually quite heavy, and the bearing support of the fly wheel upon the quill 23 completely relieves the driven shaft 21 of all load except the torque to be transmitted. Also, as previously described, this quill mounting of the fly wheel directed adjacent to the main frame 20 of the machine enables the entire clutch-brake assembly to be disposed entirely outside of the fly wheel 22 where there is maximum opportunity for air circulation to carry off the heat of repeated starting and stopping operations, and also where the clutch-brake mechanism is more accessible for servicing, adjustment, etc. It will be noted that in this embodiment disclosed in Figures 1 and 2 there is no outboard bearing, the radial load of the heavy fly wheel being carried entirely by the tubular quill 23, and the radial load of the clutch-brake mechanism being carried entirely by the shaft 21 and its bearing support in the frame and in the quill. The web of the fly wheel 22 is provided with a plurality of air circulating openings 28 through which a flow of cooling air is circulated for cooling the clutch-brake surfaces, as I shall later describe.

Mounted on the tapered end 31 of the shaft 21, outwardly of the flywheel 22, is a driven hub structure 32, which may be held in place on the shaft by a nut 33 screwing over a threaded end portion of the shaft. This hub structure 32 transmits the driving torque inwardly from the clutch elements to the shaft 21, and also transmits the braking torque outwardly from the shaft 21 to the brake elements. All of the coacting frictional surfaces of both the clutch and the brake are confined within an annular U-shaped channel 34 which is formed around the periphery of the hub structure 32. The inner side of this U-shaped channel 34 is defined by an annular flange 35 formed integrally with the hub structure and projecting outwardly therefrom at the inner side or face of the hub structure. The outer side of the U-shaped channel 34 is defined by a removable annular plate 36 which projects radially outwardly from the outer face of the hub structure, being bolted in place to the hub structure after the laterally shiftable clutch-brake plate has been assembled in place in the U-shaped channel 34. As will later appear, the inner radially extending flange or plate 35 functions as a driven clutch plate or element for coaction with the driving clutch disk, and the outer radially extending plate 36 functions as a rotating brake plate for coaction with the stationary brake disk. The bolting of the outer brake plate flange 36 to the hub structure 32 is effected by through bolts 38 which pass through the flanged inner portion of the clutch hub and through openings 39 in the plate 36, receiving nuts 41 on their outer ends, as shown in the lower half of Figure 1. As I shall later describe, these through bolts 38 also function as guide pins along which the axially shiftable clutch-brake plate has sliding movement. A plurality of dowel pins 42 engage in registering holes 42′ in the hub structure 32 and outer plate 36, so that the braking torque set up between this brake plate 36 and the hub structure is carried by the dowel pins, rather than by the through bolts 38.

The hub structure 32 is provided with a series of transverse and peripheral air circulating passageways for cooling the hub structure, and for also inducing an outward flow of air through the peripheral channel 34 so as to cool the friction clutch surfaces and the friction brake surfaces contained in this channel. These air circulating passageways are clearly illustrated in Figures 3, 4 and 5, which show the hub structure casting 32 before any of the other parts have been assembled thereon. Cored out at closely spaced points around the hub structure are transverse ventilating passageways 43, extending entirely through the hub structure from front to back, and separated from each other by radially extending webs 45 comparable to the spokes of a wheel. Each of these transverse ventilating passageways is free to draw air from the inner side and also the outer side of the hub structure, as shown by the flow arrows in Figure 1. Each transverse passageway 43 opens outwardly into the peripheral channel space 34 through a peripheral passageway 44 defined between each pair of adjacent webs 45. An annular flange portion 46 of right angle cross-section is formed integral with the radial spoke webs 45 on the outer sides of the peripheral passageways 44, and this flange portion forms a seat 46' for mounting the removable front plate 36. The radial spoke webs 45 have enlarged bosses 47 provided with countersunk drilled holes 47' for receiving the headed ends of the through bolts 33 which fasten this front brake plate 36 to the front seat 46'. The holes 42' for the dowel pins 42 are only shown in alternate spoke webs 45, but the number of these dowel pins is optional.

When the hub structure 32 is rotating during the clutch engaged interval of operation, the air passageways 43, 44 function like the air impelling passageways of a centrifugal blower, tending to whirl air outwardly through the peripheral channel 34 under centrifugal force. When the hub structure is standing stationary during the brake engaged interval of operation, the air is free to be drawn outwardly into the peripheral channel 34 under the centrifugal blower action of the continuously rotating driving clutch disk, which I shall now describe.

Referring now to this driving clutch disk, indicated in its entirety at 48, this disk rotates constantly with the fly wheel 22 and thus functions constantly as a centrifugal blower for cooling the clutch and brake parts during the entire operation of the machine. As best shown in Figures 6 and 7, this disk is preferably of composite construction, comprising two laterally spaced disk elements 48a and 48b, and each disk element being made up of a plurality of arcuate segments 48a' and 48b'. Secured to the outer face of each disk or segment is a layer of friction material 49 of asbestos fabric, metallic friction pads, or any other desired material. The two metallic disks, or their arcuate segments, are maintained in laterally spaced relation by short lengths of radially extending channel members 51, which are riveted, welded, or otherwise secured to the opposing faces of the clutch disk segments, these channel members being alternately secured to the opposite disks and alternately facing in opposite directions, as best shown in Figure 3. The radially extending spaces 52 defined between adjacent channels 51 function as air impelling openings for causing an outward discharge of air from the disk assembly, whereby this continuously rotating driving clutch disk 48 functions much in the manner of a centrifugal blower for causing a relatively high velocity discharge of a large volume of air through the composite disk structure. Entering air has ready access to the inner peripheral edge of this continuously rotating clutch disk by way of the ventilating openings 43, 44 conducting air into the U-shaped channel space 34. Because this composite clutch disk 48 is disposed on the outer side of the fly wheel 22, circulating air has more ready access thereto, and this flow of air is further augmented by the air which passes outwardly through the circulating holes 28 in the web of the fly wheel.

Referring now to the laterally flexible mounting of the composite clutch disk 48 on the fly wheel 22, the disk segments 48a' and 48b' have mounting fingers 54a and 54b formed integral with the disk segments and projecting peripherally outwardly and then annularly in the direction of rotation, as shown in Figure 2. The opposite ends of each metallic segment have oppositely facing interlocking fingers 56a and 56b, the outwardly facing finger 56a of one segment interlocking with the inwardly facing finger 56b of the adjacent segment for establishing a tie connection between segments which can be readily assembled and disassembled and which permits some relative movement between segments. The segmental construction of the disks, the provision of the flexible mounting fingers therefor, and the interlocking arrangement between segments, follow the teachings of my prior Patents Numbers 2,259,461 and 2,303,201, to which attention is directed for details. For facility of mounting and removal, the clutch disk is preferably made up of two diametrically separating half sections, wherein each half section is made up of a plurality of segments like those shown in Figure 7, which segments are joined together by half-rings (180°) of friction facing material 49 riveted to the segments, the friction material flexibly tying the segments together. The free ends of the mounting fingers 54a and 54b have apertures 59 therein for effecting bolting attachment to the fly wheel 22. This bolting attachment is adjustable to enable the bolted ends of the mounting fingers to be displaced inwardly or outwardly relatively to the fly wheel, so as to obtain the automatic separating release between friction clutch surfaces when the clutch is released. The bolting attachment is effected by cap screws 61 which pass through adjusting sleeves 62 mounted in the apertures 59 of the spring fingers 54a and 54b, the inner ends of said cap screws then threading into the web of the fly wheel. The staked mounting of the adjusting sleeve 62 in the apertures 59 is shown in Figure 6, from which it will be seen that the inner flexible mounting finger abuts a shoulder 63 on the sleeve 62, and a spacer bushing 64 is interposed between the inner and outer fingers, whereupon the outer end of the sleeve is then swaged or crimped over the outer side of the outer flexible finger, as indicated at 65. This anchors both flexible fingers to the adjusting sleeve in properly spaced relation. The sleeve has a threaded inner end 66 over which screws an adjusting nut 67, which functions as an adjustable abutment adapted to abut the adjacent surface of the fly wheel web. Screwing the nut 67 inwardly or outwardly along the threaded sleeve serves to adjust the position of the sleeve outwardly or inwardly with respect to the fly wheel, and thereby to adjust the normal unflexed positions of the clutch disk segments. Any such adjusted position of the adjusting sleeve 62 can be locked by tightening the cap screw 61. It will be seen that the cap screws 61 and adjusting nuts 67 are both readily accessible at the outer or front side of the fly wheel, because this entire clutch assembly is disposed on the outer side of the fly wheel. Figure 1 illustrates the position of the parts when the clutch is released and the brake is engaged, at which time the clutch disks are in their normal unflexed positions out of frictional contact with the driven elements of the clutch.

Referring now to the laterally flexible stationary brake disk 68, which is spaced outwardly of the clutch disk 48 within the U-shaped channel area 34 of the driven hub structure 32, this brake disk is likewise composed of four or more arcuate segments 68' having frictional material 69 on their opposite faces, which may be the same as the frictional material on the clutch disk, or may be of any other suitable material, as desired. The stationary brake disk segments are also supported by spring fingers 71 which are exactly the same as the spring fingers of the clutch disk segments. However, the spring fingers of the brake disk face in the opposite direction from the spring fingers of the clutch disk, as shown in Figure 2, because it is desirable that the driving torque and the braking torque always act as a tension stress in the spring fingers, and these two torques necessarily act in opposite directions. Proper assembly with the spring fingers facing in the opposite directions is insured by having the adjusting sleeves face from the opposite sides of the spring fingers, as will be later described. The stationary brake disk 68 is adjustably anchored to a stationary brake support ring 72 which is disposed just outside the plane of the stationary brake disk, where it completely surrounds the rotating brake plate 36. This stationary brake support ring 72 is suitably fastened to a supporting bracket 75 which is anchored to the frame or body of the machine in such relation as to stationarily hold the brake disk 68 and sustain the heavy braking torque transmitted through this disk. The spring fingers 71 are mounted for inward and outward adjustment relatively to the brake support ring 72 through an adjusting arrangement very similar to that employed for the clutch disk fingers. A cap screw 77 passes entirely through the brake support ring 72 and through a threaded adjusting sleeve 78 which is generally similar to the threaded adjusting sleeve 62 but which projects outwardly from the opposite side of the spring finger to insure that this finger will face in the opposite direction from the clutch disk finger for sustaining braking torque in tension. The outer end of this adjusting sleeve 78 is anchored in the apertured end of the finger by a crimping or staking operation, and the inward or outward position of this sleeve 78 is adjusted by an adjusting nut 79 which abuts against the back or inner side of the support ring 72. A lock nut 81 screws over the threaded end of the cap screw and abuts the inner end of the adjusting sleeve 78 for locking the latter in any adjusted position. In the brake engaged position of the parts shown in Figure 1, it will be seen how the brake disk is flexed outwardly with respect to the anchored ends of the spring fingers. When the brake is released the brake disk automatically shifts inwardly to lie substantially in the plane of the anchored ends of the fingers. By virtue of the disposal of the stationary brake disk outwardly of the clutch disk and outwardly of the fly wheel, the adjustments for adjusting the anchored positions of the spring fingers are readily accessible at the time of assembly and at any future time for taking up wear. The brake disk structure 68 might also be formed of the composite ventilated type, similarly to the clutch disk 48, if desired, but inasmuch as the brake disk 68 has no rotation the ventilated construction would not add much to the cooling effect, since there would be no centrifugally induced flow of air through the disk.

Mounted for axial shifting movement between the rotating clutch disk 48 and the stationary brake disk 68 is the clutch-brake plate 84 which effects clutch engagement when axially shifted in an inward direction, and effects brake engagement when axially shifted in an outward direction. Thus, the inner surface of this plate 84 functions as a driven clutch element for engaging with the outer frictional surface of the driving clutch disk, and the outer surface of this shiftable plate 84 functions as a rotating brake surface adapted for engagement with the adjacent frictional surface of the stationary brake disk 68. This shiftable plate is of a hollow ventilated construction having radially extending passageways 86 therein through which an outward flow of air is induced centrifugally during all rotating periods of the driven hub structure 32. The inner ends of these air circulating passageways 86 receive air from the passageways 44 in the hub structure and from the U-shaped channel 34. The passageways 86 may be formed as cored openings in a unitary casting, if desired, but in the preferred construction illustrated in Figures 1, 8 and 9, this plate 84 is shown as being divided medially into two matching sections or halves 84a and 84b which are clamped together. The outer peripheral edges of the two halves are held in spaced relation by the abutment of angularly spaced bosses 88 projecting inwardly from each half. The inner peripheral portions of the two halves are provided with angularly spaced small apertured bosses 89 and with angularly spaced large apertured bosses 91 (Figure 8) which have end-to end abutment between the two halves, and between which bosses are defined the inner ends of the air passageways 86. The apertures 92 of the large bosses 91 have a free sliding fit over the through bolts 38, as shown in the lower portion of Figure 1, these through bolts thus affording smooth, free sliding guide surfaces for shiftably supporting the clutch-brake plate 84. The apertures 93 in the small bosses 89 receive actuating bolts 94 which pass through the shiftable plate 84 and receive nuts 95 on their inner ends. The outer or front ends of these actuating bolts 94 pass through apertures in an actuating plate 96 and receive nuts 97 on their front ends. Spacing sleeves or bushings 98 are interposed between the back side of the actuating plate 96 and the front side of the clutch-brake plate 84, and these sleeves pass through openings 99 in the stationary brake plate 36. The actuating plate 96 is disposed outwardly of the hub structure 32 and brake disk 68, and is arranged to be spring urged in an outward direction for normally holding the clutch-brake plate 84 pulled over against the brake disk 68 in brake engaging relation. This outward spring loading which is normally imposed upon the actuating plate is obtained from a series of compression springs 101 which are confined between the inner side of the actuating plate 96 and the outer sides of flanges or lugs 102 projecting in an outward direction at the inner end of each air circulating passageway 44 in the hub structure 32. Extending through the springs to confine them against any lateral flexure are confining or guide pins 103 which have their rear outer ends passing slidably through openings 105 in the actuating plate 96. It will be noted that the springs 101 are disposed at the inner ends of the transverse ventilating passageways 43, where they are removed as far as possible from the source of heat, and also receive the cooling effect of the air stream. This avoids overheating of the springs, which is very important.

Referring now to the compressed air cylinder which operates to overcome the action of the springs 101, and thereby release the brake and engage the clutch, this cylinder is disposed outwardly of the entire brake assembly, the stationary brake ring 72 and actuating plate 96. The cylinder, designated 108, has a peripheral mounting flange 109 which is secured to the rotating brake plate 36 by cap screws or bolts 111. These cap screws 111 pass through apertured bosses 112 projecting from the flange 109, and thread into tapped bosses 114 projecting laterally from the rotating brake plate 36. A heat insulating gasket 115 is interposed between the bosses 114 and flange 109 so as to minimize the transmission of heat from the rotating brake plate 36 to the cylinder casting 108. Sliding within the cylinder is the piston 116 which has a pressure transmitting ring or flange 117 adapted to abut against the outer face of the actuating plate 96, there being cavities 118 cored in this ring 117 for receiving the nuts 97 of the actuating bolts 94. The cylinder 108 and piston 116 are both preferably composed of aluminum. The piston has a peripheral skirt 119 against which bears a felt dust excluding ring 120 which is held in place in a cavity in the end face of the cylinder by a sheet steel ring 121, which also serves to break the thermal contact between the aluminum air cylinder and the brake plate. The outer end portion of the piston is formed with a peripheral groove 122 in which is confined a sealing ring 123 having sliding contact with the cylinder wall, this ring 123 preferably being of the so-called "O-ring" type now extensively used in this type of structure for holding high air pressure.

Mounted axially of the cylinder head 108 is a rotating seal 125 through which compressed air is admitted into the cylinder area for acting upon the piston 116. This rotating seal comprises a tubular stem 127 which is mounted in an axial boss 128 of the cylinder 108, and which has a confining shoulder 129 which is abutted by an angular retaining ring 131 secured to the boss 128 by screws 132. Spaced anti-friction bearings 133 carried by the tubular stem 127 support a stationary housing 134 to which is attached the valve housing 135 that controls the entrance of compressed air to the cylinder 108. Mounted on this non-rotating housing 135 is an electrically operated air valve 136 which controls the admission and exhaust of compressed air to and from the cylinder 108. This electrically operated control valve 136 is preferably of the same type and construction as is shown in my copending application, Serial No. 38,248, filed July 12, 1948, now Patent No. 2,585,234 and accordingly I direct attention to that application for the details of this valve. In Figure 2 I have shown certain auxiliary devices included in the air supply line which leads to the valve 136, these auxiliary devices being very desirable in the average installation, but not being essential. For example, the air supply is shown as entering through a flexible connecting air line 137 leading to an air filter 138. The air filter in turn connects to a pressure regulator 139 which has an indicating pointer for indicating the predetermined pressure to which the regulator has been set. From the regulator 139 the air passes through a lubricator 141, and from the outlet side of this lubricator the air has connection through conduit 142 with a surge tank 143 which stores enough compressed air to give very rapid operation to the clutch-brake mechanism without any time delay that might otherwise be imposed by the pressure regulator 139. In other words, the continuous flow through the pressure regulator 139 builds up an adequate amount of air in the surge tank 143 for effecting very rapid operation of the clutch-brake through one operating cycle, and in the interval between cycles the surge tank replenishes its supply. It is believed that the operation of the entire mechanism will be apparent from the preceding description.

The very effective cooling circulation of the air is illustrated by the flow arrows in Figure 1. The centrifugal blower action through the hollow clutch disk 48 sets up paths of flow from the inside and outside of the clutch-brake assembly, so that there is a very efficient cooling of all of the friction surfaces of the clutch-brake assembly, but particularly of the clutch surfaces, where most of the heat is generated. Attention is directed to the fact that the centrifugal air impelling passageways in the continuously rotating driving clutch disk 48 establish a continuous main circulation of air in contact with the clutch parts during the entire time that the machine is operating. This continuous main circulation of air continues to exert a cooling action on the clutch and brake parts after the clutch has been released and the machine is standing idle awaiting another clutch engaging operation. This is helpful in quickly dissipating built up accumulations of heat. Attention is also directed to the fact that the centrifugal air impelling passageways in the hub structure 32 and in the clutch-brake plate 84 establish supplementary circulations of air in contact with the clutch and brake parts, which latter circulations of air serve to supplement the aforesaid main circulation of air as soon as rotation is transmitted to the driven shaft 21 and as long as that shaft continues to rotate. The continuously flowing main air stream and the intermittently flowing supplementary air streams assure that a large volume of cooling air will contact the clutch and brake parts for effectively cooling them.

Another feature or operating advantage which is obtained by the particular construction shown in Figure 1 is the higher speed of operation of the clutch-brake mechanism by virtue of the immediate proximity of the compressed air cylinder 108 to the electrically operated air valve 136. This immediate proximity results in a minimum length of air passageway between the air cylinder and air valve for obtaining a more rapid flow of air between the valve and cylinder in the admission of compressed air to the cylinder and the exhausting of air therefrom. In high speed punch presses operating at speeds ranging upward of 500 R. P. M., the time interval for admitting and exhausting the air, particularly for single stroke operation of the press, is an extremely small fraction of a second. Hence, it is of great importance in such type of installation that the air passageway between the air valve and the air cylinder be of the shortest possible length, and be free of constrictions or tortuous formations which would impede the air flow. In the embodiment shown in Figure 1, by virtue of having the air cylinder 108 and piston 116 disposed outwardly of the clutch mechanism and outwardly of the brake mechanism, so that the air cylinder 108 constitutes the outermost element of the entire assembly, it is possible to mount the air valve 136 directly on the cylinder in immediate proximity thereto, with only a short length rotary seal 135 intervening. The short length, large diameter bore of this rotary seal avoids the restrictions or resistance to high speed air flow usually found in situations where the air must be conveyed through longitudinal passageways and right angle passageways formed in the driving or the driven shaft of the mechanism. Thus, a higher speed operation of my improved clutch-brake mechanism can be obtained.

In Figure 10 I have illustrated a modified embodiment of my invention wherein a greater power transmitting capacity is obtained by employing two driving clutch disks 148 and 148', and two axially shiftable driven plates 184 and 184'. The two clutch disks 148, 148' are preferably identical with the previously described clutch disk 48, and the two shiftable plate 184, 184' are preferably identical with the previously described clutch-brake plate 84. However, the inner plate 184 has only the function of a clutch plate, whereas the outer plate 184' has the two-fold function of a clutch plate and a brake plate. The two driving clutch disks 184, 184' are mounted on a drive ring 151 which is secured by bolts or cap screws 152 to the side of the fly wheel 22. This drive ring is formed with an inwardly extending mounting flange 153 which is apertured at intervals for receiving transverse mounting bolts 154. The apertured ends of the spring arms of both clutch disks 184, 184' are provided with the threaded adjusting sleeves 66 and adjusting nuts 67 as described of the embodiment shown in Figures 1 and 6. Thus, the spring fingers of the inner and outer clutch disks can be adjusted either inwardly or outwardly by screwing the nuts 67 in one direction or another along the sleeves 66, these nuts abutting the adjacent faces of the mounting flange 153. The mounting fingers can be locked in their desired positions of adjustment by nuts 155 which screw over the threaded ends of the threaded sleeves 66. The drive ring 151 has peripheral air circulating openings 156 for augmenting the outward air flow through the inner clutch disk 148.

Referring now to the two axially shiftable driven plates 184 and 184', both of these plates have sliding mounting on through bolts 38 in the same manner described of the preceding embodiment. The actuating bolts 94 also extend through both these outer and the inner plates, but only the outer plate 184' is positively actuated by these actuating bolts. The outer ends of the bolts are mounted in the actuating plate 96, and spacing bushings 98 are interposed between the back side of this actuating plate and the front side of the outer clutch-brake plate 184', the same as previously described. Beyond the outer clutch-brake plate 184' a thin spacing sleeve 158 is mounted over the actuating bolt 94 and is drawn up hard against the inner side of the clutch-brake plate 184' by the washer 95' and the nut 95 screwing over the inner end of the actuating bolt. This portion of the bolt and its surrounding spacing sleeve 158 pass freely through an aperture 159 in the inner clutch plate 184, whereby said latter plate is always free to slide along the actuating bolts and their surrounding sleeves 158. Surrounding each actuating bolt and its sleeve 158 are inner and outer compression springs 161 and 162 which react against the nut and washer 95, 95' and against the outer clutch-brake plate 184', so as to tend to center the inner clutch plate 184 in the proper position between the two driving clutch disks 148, 148'. This shiftable mounting between the opposing springs establishes a free floating support for the inner clutch plate 184, so that the latter plate always tends to return to a properly centered position, out of engagement with both the inner and outer driving clutch disks, as soon as the clutch is released. It will be seen that when the actuating plate 96 moves inwardly in the clutch engaging, brake releasing operation, the outer clutch-brake plate 184' will be moved over positively through the positive thrusting action of the outer spacing sleeves 98. This positive thrusting action will release the outwardly disposed brake disk and will then start to crowd all of the frictional clutch surfaces inwardly toward the back clutch plate 35. In this operation, the inner clutch plate 184 follows along with the shifting motion imparted thereto by the outer driving clutch plate 148' in such clutch contracting operation. In the reverse clutch releasing, brake engaging operation effected by the pressure of the springs 101 upon the release of the air pressure, the outer clutch-brake plate 184' is caused to move positively and directly with the actuating plate 96 by reason of the thrusting action of the spacing sleeves 158 against the inner face of said outer clutch-brake plate 184', so that the brake engaging operation receives the full force of the springs 101. However, the inner clutch plate 184 is at this time only impelled outwardly by the inner compression springs 161, and hence this inner clutch plate only moves outwardly to a sufficient degree to release the latter clutch plate from dragging frictional contact with the two rotating clutch disks.

The non-rotating brake disk 68 has its spring fingers adjustably mounted on a stationary brake support ring 72 in substantially the same manner as previously described. In this modified embodiment shown in Figure 10, the brake support ring 72 is shown as being bolted to a bed casting 164 or like structural part of the machine. By way of illustrating a further modification which might be desired in machines having extremely heavy shaft loads, I have shown this bed casting 164 as supporting an outboard bearing 165, preferably provided with radial and thrust load sustaining roller bearings 166, for the outer end of the driven shaft 31. This outboard bearing is disposed outwardly of the compressed air cylinder 108, and accordingly the shaft 31 has an outer portion 31' which extends through the center of the air cylinder and piston. To maintain an air-tight seal at this point and still receive the compressed air through an axial opening in the shaft, the cylinder 108 is formed with an inwardly extending hub flange 168 provided with longitudinally spaced internal grooves for receiving internal sealing rings 171 and 172. An annular cavity 173 is formed within the hub 168 between these two sealing rings, and this cavity has connection with the interior of the cylinder through diagonal passageways 174. The piston 116 also has an inwardly extending hub portion 176 having a sliding fit over the outer surface of the hub portion 168 and engaging a sealing ring 177 carried by the hub portion 168. The compressed air is conducted to the internal annular groove 173 through an axial bore 178 in the outer portion of the shaft communicating through radial passageways with the internal groove 173. The outer end of the axial bore 178 communicates through a rotary seal 181 with a stationary valve housing 135 supporting an electrically operated control valve 136, preferably the same type of air valve as previously described. The rotary seal 181 may be of any suitable type or construction, one typical form being disclosed in my copending application, Serial No. 106,942, filed July 26, 1949. If desired, a brace 182 may be extended from the upper portion of the outboard bearing 165 to the upper portion of the stationary brake support ring 72. The flow of the cooling air will be understood from the preceding description and from the directional flow arrows diagrammatically shown in Figure 10. The mode of operation of this modified embodiment will be apparent from the description of the preceding embodiment.

In both of the above described embodiments, one of the objects of making the laterally flexible clutch disks and the laterally flexible brake disks in the form of separable arcuate segments is to facilitate the assembly of the clutch disks and the brake disks in the clutch-brake structures, and also to facilitate the removal of the clutch disks and brake disks either for substitution of disks or for replacing the frictional surfaces thereon in the event of heavy wear. The fact that the disks are in the form of separable segments enables them to be easily inserted into the peripheral channel 34 after the plate 36 is in place in the initial assembly, and also enables these segments to be thereafter readily removed and replaced without dismantling the entire clutch-brake structure. Also, this is only made practicable or feasible because both the clutch mechanism and the brake mechanism are on the outer side of the driving flywheel, where they are conveniently accessible for such assembly, removal, replacement, adjustment, etc.

As will be apparent from the preceding description, a very important feature of this invention is the provision for complete air circulation to carry off the heat generated by repeated start-stop operations. With a friction clutch, the amount of energy that is dissipated in the form of friction generated heat may in many instances exceed the amount of energy required to perform the work for which the punch press or shear was designed. When the driven parts of the clutch and press or shear are accelerated from rest up to speed the amount of heat generated by a friction clutch is approximately equal to the energy necessary to overcome the inertia of the driven parts, and obviously the heat generated by the friction brake is equal to the energy necessary to stop the rotating mass; i. e., the kinetic energy of rotating parts is converted to heat by the brake in making a stop. What is often lost sight of is the fact that starting this mass by the use of a friction clutch involves approximately the same heat loss as stopping it by means of a brake. Therefore, repeated start-stop operations at relatively high speeds can and do involve a tremendous amount of heat that must be dissipated if the clutch-brake is to run at a safe operating temperature.

Comparative tests which I have made on these clutch-brake mechanisms, with and without the above-described cooling features, have clearly demonstrated the importance of such cooling features. A test rig was built with a variable timing mechanism that would actuate the solenoid operated air valve at predetermined constant rates for extended periods of time. With this test rig, it was found that in the original design without the ventilated form of clutch-brake plate 84, without the ventilated form of driving clutch disk 48 and without the ventilated form of hub structure 32, the mechanism could only be operated up to 30 starts and stops per minute, or at a rate of .81 B. t. u. per square inch per minute, before the mechanism reached a critical operating temperature of 500° F. Something had to be done to increase the heat dissipating ability of the mechanism so as to permit faster start-stop operation. Many schemes and modifications were tried, such as drilling radial holes in the clutch-brake plate, adding forced air circulation over and around the clutch-brake mechanism, etc. Finally, the combination of the ventilated clutch-brake plate and the ventilated driving clutch disk was devised, and this construction enabled the cyclic rate to be increased to 50 start-stops per minute, or a rate of 1.35 B. t. u. per square inch per minute before the operating temperature exceeded the critical 500° F. Providing increased air space in the hub structure to permit increased air flow resulted in a further decrease of stable operating temperatures. In the embodiment of Figure 10, which was required to operate at a rate of 15 starts and 15 stops per minute, resulting in .78 B. t. u./sq. in./min., the operating temperature stabilized at 278° F. when made with the ventilated shiftable clutch-brake plate and ventilated driving clutch disk. These tests conclusively showed the paramount importance and efficacy of the cooling features described above.

Also, in the embodiment disclosed in Figure 10, the mounting of the compressed air cylinder 108 and piston 116 outwardly of the clutch and brake mechanisms serves to shorten the length of the air path between the cylinder 108 and the air control valve 136 for increasing the operating speed, as pointed out above in connection with Figure 1.

While I have illustrated and described what I regard to be the preferred embodiments of my invention, nevertheless it will be understood that such are merely exemplary and that numerous modifications and rearrangements may be made therein without departing from the essence and scope of the invention.

I claim:

1. In an air operated clutch-brake mechanism of the class described, the combination of a machine frame, a stationary mounting quill projecting from said frame, a driving flywheel journaled for bearing support on said stationary mounting quill in proximity to said machine frame, a driven shaft extending outwardly through said quill and having substantially full-floating bearing mounting in said quill and frame, a driven hub structure mounted on said driven shaft outwardly of said quill and flywheel, said driven shaft having its outer end terminating substantially at said driven hub structure, friction disk clutch mechanism for transmitting rotation from said flywheel to said driven hub structure, said disk clutch mechanism being disposed outwardly of said flywheel and comprising a driven clutch disk mounted on said driven hub structure, a friction disk brake mechanism for stopping and holding said driven hub structure and shaft against rotation when said clutch mechanism is released, said disk brake mechanism being disposed outwardly of said disk clutch mechanism and comprising a rotating brake disk mounted on said driven hub structure, a single compressed air operated cylinder and piston power unit mounted on said driven hub structure with the axis of the cylinder and piston aligned with the axis of said driven shaft and rotating directly with said shaft, said cylinder and piston power unit being operatively connected to actuate said disk clutch mechanism and said disk brake mechanism alternately, said cylinder and piston power unit being disposed outwardly of said disk clutch mechanism and said disk brake mechanism and extending across the outer end of said driven shaft, a rotary seal carried by said cylinder and piston power unit in axial alignment with said driven shaft, and a compressed air control valve mounted on said rotary seal adjacent to said power unit for controlling the admission of compressed air to and the exhaust of air from said power unit, the disposal of said power unit outwardly of said clutch and brake mechanisms enabling said power unit and control valve to be disposed in immediate proximity to each other with a minimum length of air path therebetween through said rotary seal, whereby to secure a maximum rate of air flow between said valve and power unit in the air admission and exhaust functions for obtaining high speed operation of the clutch-brake mechanism.

2. In an air operated clutch-brake mechanism of the class described, the combination of a machine frame, a driven shaft extending therefrom, a driving flywheel mounted concentrically of said driven shaft in proximity to said machine frame, a driven hub structure mounted on said driven shaft, friction disk clutch mechanism for transmitting rotation from said flywheel to said driven hub structure, said disk clutch mechanism being disposed outwardly of said flywheel and comprising a driven clutch disk mounted on said driven hub structure, friction disk brake mechanism for stopping and holding said driven hub sturcture and shaft against rotation when said clutch mechanism is released, said disk brake mechanism being disposed outwardly of said disk clutch mechanism and comprising a rotating brake disk mounted on said driven hub structure, a single compressed air operated cylinder and piston power unit mounted on said driven hub structure with the axis of the cylinder and piston aligned with the axis of said driven shaft and rotating directly with said shaft, said cylinder and piston power unit being operatively connected to actuate said disk clutch mechanism and said disk brake mechanism alternately, said cylinder and piston power unit being disposed outwardly of said disk clutch mechanism and said disk brake mechanism and extending across the outer end of said driven shaft, a rotating seal carried by said cylinder and piston power unit in axial alignment with said driven shaft, and a compressed air control valve mounted on said rotary seal adjacent to said power unit for controlling the admission of compressed air to and the exhaust of air from said power unit, the disposal of said power unit outwardly of said clutch and brake mechanisms enabling said power unit and control valve to be disposed in immediate proximity to each other with a minimum length of air path therebetween through said rotary seal, whereby to secure a maximum rate of air flow between said valve and power unit in the air admission and exhaust functions for obtaining high speed operation of the clutch-brake mechanism.

3. In a compressed air operated clutch-brake mechanism for controlling the motion of a driven shaft mounted in a machine frame and adapted to be driven from a continuously rotating flywheel in response to the operation of a compressed air control valve, the combination of a driven hub structure mounted on said driven shaft outwardly of said flywheel, friction disk clutch mechanism for transmitting rotation from said flywheel to said driven hub structure, said disk clutch mechanism being disposed outwardly of said flywheel and comprising a driven clutch disk mounted on said driven hub structure, friction disk brake mechanism for stopping and holding said driven hub structure and shaft against rotation when said clutch mechanism is released, said disk brake mechanism being disposed outwardly of said disk clutch mechanism and comprising a rotating brake disk mounted on said driven hub structure, a single compressed air operated cylinder and piston power unit operatively connected to actuate said clutch mechanism and said brake mechanism alternately, said cylinder and piston power unit being mounted outwardly of said clutch and brake mechanisms and with the cylinder and piston having their axis aligned with the axis of said driven shaft and hub structure and rotating directly therewith, and a rotary seal establishing communication between said cylinder and said compressed air control valve, the disposal of said compressed air power unit outwardly of said clutch and brake mechanisms shortening the length of air path between said power unit and said control valve so as to increase the rate of air flow therebetween in the air admission and exhaust functions.

4. In an air operated clutch-brake mechanism of the class described, the combination of a machine frame, a driven shaft extending therefrom, a driving flywheel mounted concentrically of said driven shaft in proximity to said main frame, friction disk clutch mechanism for connecting said flywheel to said driven shaft, said friction disk clutch mechanism being disposed outwardly of said flywheel and comprising a driving clutch disk rotating continuously with said flywheel, friction disk brake mechanism for holding said driven shaft when the clutch mechanism is released, said friction disk brake mechanism being disposed outwardly of said friction disk clutch mechanism and said flywheel and comprising a non-rotating brake disk, a shiftable clutch-brake plate adapted to effect engagement selectively with said clutch disk or with said brake disk, a compressed air operated cylinder and piston operatively connected to actuate said shiftable clutch-brake plate for engaging said clutch mechanism and said brake mechanism alternately, said cylinder and piston being disposed outwardly of said friction disk brake mechanism and said friction disk clutch mechanism, centrifugal air impelling passageways in said driving clutch disk for establishing a continuous main circulation of air in contact with said clutch disk during the entire time that the flywheel is rotating, and centrifugal air impelling passageways in said clutch-brake plate for establishing a supplementary circulation of air in contact with said clutch-brake plate when said driven shaft rotates.

5. In an air operated clutch-brake mechanism of the class described, the combination of a machine frame, a driven shaft extending therefrom, a driving flywheel mounted concentrically of said driven shaft, a stationary brake support, a hub structure mounted on said driven shaft, a flange projecting radially outwardly from the periphery of said hub structure at one side thereof for functioning as a clutch plate, a flange projecting radially outwardly from the periphery of said hub structure at the other side thereof for functioning as a brake plate, said two flanges defining therebetween a U-shaped peripheral channel extending around said hub structure, a driving clutch disk operatively connected with said flywheel and lying in said peripheral channel adjacent to said clutch plate, a non-rotating brake disk connected with said stationary brake support and lying in said peripheral channel adjacent to said brake plate, a shiftable clutch-brake plate lying in said peripheral channel between said clutch and brake disks and adapted by shifting movement in one direction to establish clutching engagement between said clutch disk and said clutch plate, and adapted by shifting movement in the other direction to establish braking engagement between said brake disk and said brake plate, a compressed air cylinder mounted on said brake plate to rotate therewith, a piston in said cylinder operatively connected to actuate said shiftable clutch-brake plate, centrifugal air impelling passageways in said driving clutch disk for establishing a continuous main circulation of air through said clutch disk during the entire time that the flywheel is revolving, and centrifugal air impelling passageways in said clutch-brake plate for establishing a supplementary circulation of air through said clutch-brake plate when the driven shaft rotates.

6. In an air operated clutch-brake mechanism of the class described, the combination of a machine frame, a driven shaft carried thereby, a driving flywheel mounted concentrically of said driven shaft, a hub structure mounted on said driven shaft, a flange projecting radially from the inner side of said hub structure to form a driven clutch plate, a removable brake flange secured to the outer side of said hub structure, said two flanges defining a U-shaped peripheral channel therebetween extending around said hub structure, a driving clutch disk operatively connected with said flywheel and disposed in said U-shaped channel, a stationary brake support, a non-rotating brake disk operatively connected with said brake support and disposed in said U-shaped channel, a shiftable clutch-brake plate disposed between said clutch disk and said brake disk in said U-shaped channel, a compressed air cylinder and piston for actuating said shiftable clutch-brake plate, bolts extending transversely of said hub structure for securing said removable brake flange thereto, and guide apertures carried by said shiftable clutch-brake plate having guided engagement along said bolts for guiding the shifting movement of said clutch-brake plate.

7. In an air operated clutch-brake mechanism of the class described, the combination of a machine frame, a driven shaft extending therefrom, a driving flywheel mounted concentrically of said driven shaft in proximity to said machine frame, disk clutch mechanism for connecting said flywheel to said driven shaft, said disk clutch mechanism being disposed outwardly of said flywheel and comprising coacting driving and driven clutch disks, said driving clutch disk having radially extending air impelling passageways therein for centrifugally impelling a flow of cooling air through said disk, flexible mounting fingers extending from the outer periphery of said driving clutch disk and having attachment to said flywheel, said flexible mounting fingers normally tending to shift said driving clutch disk substantially out of frictional engagement with said driven clutch disk when said clutch mechanism is released, a relatively stationary brake support, disk brake mechanism for holding said driven shaft when the clutch is released, said disk brake mechanism comprising a rotating brake disk and a coacting non-rotating brake disk, flexible mounting fingers extending from the outer periphery of said non-rotating brake disk and having attachment to said stationary brake support, said latter flexible mounting fingers normally tending to shift said non-rotating brake disk substantially out of frictional engagement with said rotating brake disk when said disk brake mechanism is released, said disk brake mechanism being disposed outwardly of said disk clutch mechanism and said flywheel, a shiftable clutch-brake plate connected with said driven shaft and disposed between said driving clutch disk and said non-rotating brake disk for selective engagement with either, and a compressed air operated cylinder and piston operatively connected to shift said shiftable clutch-brake plate so as to engage said disk clutch mechanism or said disk brake mechanism alternately, said cylinder and piston being disposed outwardly of said disk brake mechanism and said disk clutch mechanism.

8. In an air operated clutch-brake mechanism of the class described, the combination of a machine frame, a driven shaft extending therefrom, a driving flywheel mounted concentrically of said driven shaft in proximity to said machine frame, a hub structure mounted on said driven shaft, a relatively stationary brake support, disk clutch mechanism for connecting said flywheel to said hub structure, said disk clutch mechanism being disposed outwardly of said flywheel and comprising a driving clutch disc having radially extending air impelling passageways therein for centrifugally impelling a flow of cooling air through said disk, flexible mounting fingers extending from the outer periphery of said driving clutch disk, adjusting means for securing said mounting fingers to said flywheel for inward or outward adjustment relatively thereto, a rotating driven clutch surface on said hub structure adapted for clutching engagement with said driving clutch disk, said flexible mounting fingers normally tending to shift said non-rotating brake disk substantially out of frictional engagement with said driven clutch surface when said clutch mechanism is released, disk brake mechanism for holding said driven shaft and hub structure when the clutch is released, said disk brake mechanism being disposed outwardly of said disk clutch mechanism and said flywheel and comprising a non-rotating brake disk, flexible mounting fingers extending from the outer periphery of said brake disk, adjusting means for securing said mounting fingers to said relatively stationary brake support for inward or outward adjustment relatively thereto, a rotating brake surface on said hub structure adapted to effect braking engagement with said brake disk, said latter flexible mounting fingers normally tending to shift said non-rotating brake disk substantially out of frictional contact with said rotating brake surface when said brake mechanism is released, a shiftable clutch-brake plate shiftably mounted on said hub structure and adapted to effect axial clutching pressure against said clutch disk or to effect axial braking pressure against said brake disk, said shiftable clutch-brake plate having radially extending air impelling passageways therein for centrifugally impelling a flow of cooling air through said plate, and a compressed air operated cylinder and piston mounted on said hub structure to rotate therewith and operatively connected to shift said shiftable clutch-brake plate, said cylinder and piston being disposed outwardly of said disk clutch mechanism and said disk brake mechanism.

9. In an air operated clutch-brake mechanism of the class described, the combination of a machine frame, a driven shaft extending therefrom, a driving flywheel mounted concentrically of said driven shaft in proximity to said machine frame, a hub structure mounted on said driven shaft, a relatively stationary brake support, disk clutch mechanism for connecting said flywheel to said hub structure, said disk clutch mechanism being disposed outwardly of said flywheel and comprising a driving clutch disk having radially extendng air impelling passageways therein for centrifugally impelling a flow of cooling air through said disk, flexible mounting fingers extending from the outer periphery of said driving clutch disk, adjusting means for securing said mounting fingers to said flywheel for inward or outward adjustment relatively thereto, a rotating driven clutch surface on said hub structure adapted for clutching engagement with said driving clutch disk, said flexible mounting fingers normally tending to shift said driving clutch disk out of substantial frictional engagement with said driven clutch surface when said clutch mechanism is released, disk brake mechanism for holding said driven shaft and hub structure when the clutch is released, said disk brake mechanism being disposed outwardly of said disk clutch mechanism and said flywheel and comprising a non-rotating brake disk, flexible mounting fingers extending from the outer periphery of said brake disk, adjusting means for securing said mounting fingers to said relatively stationary brake support for inward or outward adjustment relatively thereto, a rotating brake surface on said hub structure adapted to effect braking engagement with said brake disk, said latter flexible mounting fingers normally tending to shift said non-rotating brake disk out of substantial frictional contact with said rotating brake surface when said brake mechanism is released, a shiftable clutch-brake plate shiftably mounted on said hub structure and adapted to effect axial clutching pressure against said clutch disk or to effect axial braking pressure against said brake disk, said shiftable clutch-brake plate having radially extending air impelling passageways therein for centrifugally impelling a flow of cooling air through said plate, a shiftable actuating plate disposed outwardly of said shiftable clutch-brake plate and operatively connected thereto, compression springs acting between said hub structure and said actuating plate normally tending to shift said actuating plate and clutch-brake plate outwardly for normally holding said clutch mechanism released and said brake mechanism engaged, a compressed air operated cylinder and piston mounted on said hub structure to rotate therewith and operatively connected to shift said shiftable actuating plate in an inward direction, said cylinder and piston being disposed outwardly of said disk clutch mechanism and said disk brake mechanism, and a rotating seal through which compressed air is supplied to said cylinder.

10. In an air operated clutch-brake mechanism of the class described for controlling the start-stop motion of a driven shaft extending from a machine frame and adapted to be driven from a continuously rotating flywheel, the combination of axially spaced inner and outer driving clutch disks, said inner clutch disk being disposed adjacent to said flywheel and said outer disk being axially spaced outwardly from said inner disk, spring mounting fingers projecting peripherally from said driving clutch disks, means for attaching said spring mounting fingers on said flywheel, a hub structure adapted for mounting on said driven shaft, an abutment flange on said hub structure disposed inwardly of said inner driving clutch disk, an intermediate driven clutch disk mounted for axial shifting movement on said hub structure and disposed between said inner and outer driving clutch disks, an outer driven clutch disk mounted for axial shifting movement on said hub structure and disposed on the outer side of said outer driving clutch disk, said spring mounting fingers normally tending to shift said driving clutch disks out of substantial frictional contact with said abutment flange and said outer driven clutch disk when the clutch is released, a non-rotating brake disk disposed on the outer side of said outer driven clutch disk, a stationary brake support, flexible mounting fingers projecting from the periphery of said brake disk, means for attaching said latter mounting fingers to said brake support, an outer abutment flange on said hub structure, said latter flexible mounting fingers normally tending to shift said non-rotating brake disk out of substantial frictional contact with said outer abutment flange when the brake is released, a compressed air operated cylinder and piston mounted on said hub structure to rotate therewith and disposed outwardly of said outer abutment flange, motion transmitting members connecting said outer driven clutch disk with said piston for motion directly therewith, compression springs acting between said hub structure and said piston for normally holding said brake disk compressed between said outer driven clutch disk and said outer abutment flange, with said driving clutch disks released, spring support rods extending from said outer driven clutch disk through said inner driven clutch disk, and inner and outer compression springs mounted on said spring support rods and acting in opposition against the inner and outer sides of said inner driven clutch disk for yieldably holding the latter in an intermediate position substantially out of engagement with said driving clutch disks in the clutch released condition of the mechanism.

11. In an air operated clutch-brake mechanism of the class described for controlling the start-stop motion of a driven shaft extending from a machine frame and adapted to be driven from a continuously rotating flywheel, the combination of axially spaced inner and outer driving clutch disks, said inner clutch disk being disposed adjacent to said flywheel and said outer disk being axially spaced outwardly from said inner disk, spring mounting fingers projecting peripherally from said driving clutch disks, means for attaching said spring mounting fingers on said flywheel, radially extending air impelling passageways in said driving clutch disks for centrifugally impelling cooling streams of air therethrough, a hub structure adapted for mounting on said driven shaft, an abutment flange on said hub structure disposed inwardly of said inner driving clutch disk, an intermediate driven clutch disk mounted for axially shifting movement on said hub structure and disposed between said inner and outer driving clutch disks, an outer driven clutch disk mounted for axial shifting movement on said hub structure and disposed on the outer side of said outer driving clutch disk, said spring mounting fingers normally tending to shift said driving clutch disks out of substantial frictional contact with said abutment flange and said outer driven clutch disk when the clutch is released, radially extending air impelling passageways in said intermediate and outer driven clutch disks for centrifugally impelling cooling streams of air therethrough, a non-rotating brake disk disposed on the outer side of said outer driven clutch disk, a stationary brake support, flexible mounting fingers projecting from the periphery of said brake disk, means for attaching said latter mounting fingers to said brake support, an outer abutment flange on said hub structure, having braking coaction with said non-rotating brake disk, said latter flexible mounting fingers normally tending to shift said non-rotating brake disk out of substantial frictional contact with said outer abutment flange when the brake mechanism is released, a compressed air operated cylinder and piston mounted on said hub structure to rotate therewith and disposed outwardly of said outer abutment flange, motion transmitting members connecting said outer driven clutch disk with said piston for motion directly therewith, compression springs acting between said hub structure and said piston for normally holding said brake disk compressed between said outer driven clutch disk and said outer abutment flange, with said driving clutch disks released, spring support rods extending from said outer driven clutch disk through said inner driven clutch disk, and inner and outer compression springs mounted on said spring support rods and acting in opposition against the inner and outer sides of said inner driven clutch disk for yieldably holding the latter in an intermediate position substantially out of engagement with said driving clutch disks in the clutch released condition of the mechanism.

12. In an air operated clutch-brake mechanism of the class described, the combination of a hub structure adapted for mounting upon a driven shaft for rotating said shaft, a U-shaped peripheral channel extending around the outside of said hub structure, a driving clutch disk disposed in said U-shaped peripheral channel and adapted to be connected to a driving flywheel, a non-rotating brake disk disposed in said U-shaped peripheral channel and adapted for connection to a stationary brake support, an axially shiftable clutch-brake plate mounted in said U-shaped peripheral channel between said clutch disk and brake disk and movable selectively into and out of engagement with said disks, a compressed air cylinder mounted upon said hub structure to rotate therewith, a piston in said cylinder, means operatively connecting said piston with said axially shiftable clutch-brake plate, transverse ventilating passageways extending transversely through said hub structure from front to back, and radially ventilating passageways extending radially through said hub structure from said transverse ventilating passageways to said U-shaped peripheral channel, said ventilating passageways tending during the rotation of said hub structure to impel an outward flow of air into said U-shaped peripheral channel for cooling said clutch disk and said brake disk.

13. In an air operated clutch-brake mechanism of the class described, the combination of a hub structure adapted for mounting upon a driven shaft for rotating said shaft, a U-shaped peripheral channel extending around the outside of said hub structure, a driving clutch disk disposed in said U-shaped peripheral channel and adapted to be connected to a driving flywheel, a non-rotating brake disk disposed in said U-shaped peripheral channel and adapted for connection to a stationary brake support, an axially shiftable clutch-brake plate mounted in said U-shaped peripheral channel between said clutch disk and brake disk and movable selectively into and out of engagement with said disks, a compressed air cylinder mounted upon said hub structure to rotate therewith, and a piston in said cylinder operatively connected with said axially shiftable clutch-brake plate for shifting the latter, said shiftable clutch-brake plate being divided medially into front and rear matching halves provided with cooperating bosses which space the main surfaces of said two halves apart a distance sufficient to define radially extending air circulating passageways in said clutch-brake plate for radially impelling a cooling flow of air through said plate when the latter rotates.

References Cited in the file of this patent

UNITED STATES PATENTS

| Number | Name | Date |
|---|---|---|
| 2,039,128 | Tiedmann | Apr. 28, 1936 |
| 2,108,059 | Glasner | Feb. 15, 1938 |
| 2,180,218 | Wissman | Nov. 14, 1939 |
| 2,221,014 | Williamson | Nov. 12, 1940 |
| 2,241,242 | Friedman | May 6, 1941 |
| 2,252,906 | Williamson | Aug. 19, 1941 |
| 2,259,461 | Eason | Oct. 21, 1941 |
| 2,303,201 | Eason | Nov. 24, 1942 |
| 2,472,452 | Wissman | June 7, 1949 |
| 2,505,600 | Wissman | Apr. 25, 1950 |